US006798537B1

(12) United States Patent
Lau et al.

(10) Patent No.: US 6,798,537 B1
(45) Date of Patent: Sep. 28, 2004

(54) DIGITAL COLOR HALFTONING WITH GENERALIZED ERROR DIFFUSION VECTOR GREEN-NOISE MASKS

(75) Inventors: Daniel L. Lau, New Castle, DE (US); Gonzalo R. Arce, Wilmington, DE (US); Neal C. Gallagher, Fort Collins, CO (US)

(73) Assignee: The University of Delaware, Newark, DE (US)

( * ) Notice: Subject to any disclaimer, the term of this patent is extended or adjusted under 35 U.S.C. 154(b) by 0 days.

(21) Appl. No.: 09/489,648

(22) Filed: Jan. 24, 2000

Related U.S. Application Data
(60) Provisional application No. 60/117,415, filed on Jan. 27, 1999.

(51) Int. Cl.[7] .............................. B41B 1/00; G06K 1/00; G06F 15/00; B41J 5/00
(52) U.S. Cl. ...................... 358/1.9; 358/3.03; 358/3.22; 358/534; 358/3.21; 358/3.24; 382/252; 382/270
(58) Field of Search .................... 358/1.9, 354, 3.03, 358/466, 465, 518, 3.19, 536, 3.05, 535, 3.06, 3.22, 3.13, 3.2, 3.26, 523, 3.23, 3.04, 3.1, 3.12, 3.17, 3.24; 382/252, 237, 270, 275, 162, 173, 176

(56) References Cited

U.S. PATENT DOCUMENTS

| | | | |
|---|---|---|---|
| 5,055,942 A | 10/1991 | Levien | 358/456 |
| 5,111,310 A | 5/1992 | Parker et al. | 358/456 |
| 5,317,418 A | 5/1994 | Lin | 358/456 |
| 5,341,228 A | 8/1994 | Parker et al. | 358/534 |
| 5,477,305 A | 12/1995 | Parker et al. | 358/456 |
| 5,649,083 A | 7/1997 | Barkans et al. | 395/131 |
| 5,726,772 A | 3/1998 | Parker et al. | 358/456 |
| 6,493,112 B1 * | 12/2002 | Arce et al. | 358/3.19 |
| 2003/0038953 A1 * | 2/2003 | Damera-Venkata | 358/1.9 |

OTHER PUBLICATIONS

Lau D. L. et al, Green Noise Digital Halftoning, Oct. 1998, Proceedings International Conference on Image Processing, vol. 2 39–43.*
Lau D. L. et al., Blue– and Green–Noise Halftoning Models, Jul. 2003, Signal Processing Magazine IEEE, vol. 20, Issue 4, 28–38.*
Lau, D. L., et al., Green–noise digital halftoning, Dec. 1998, Proceedings of the IEEE, vol. 86 Issue 12, 2424–2444.*
Lau, D. L. et al., Digital Color Halftoning with Generalized Error Diffusion and Multichannel Green–Noise Mask, May 2000, IEEE Transactions on Image Processing, vol.: 9 Issue 5, 923–935.*
R. Levien, "Output Dependent Feedback in Error Diffusion Halftoning," *Recent Progress In Digital Halftoning*, vol. 1, pp. 106–109 (1994).

* cited by examiner

*Primary Examiner*—Kimberly Williams
*Assistant Examiner*—Melanie Vida
(74) *Attorney, Agent, or Firm*—Connolly Bove Lodge & Hutz LLP

(57) ABSTRACT

Disclosed are two novel techniques for digital color halftoning with green-noise stochastic dither patterns generated by homogeneously distributing minority pixel clusters. The first technique employs error diffusion with output-dependent feedback such that the overlapping of pixels of different colors can be regulated for increased color control. The second technique uses a green-noise mask which is a dither array designed to create green-noise halftone patterns. The green-noise mask is constructed to also regulate the overlapping of different colored pixels. As is the case with monochrome image halftoning, both techniques are tunable, allowing for large clusters in printers with high dot-gain characteristics, and small clusters in printers with low dot-gain characteristics.

8 Claims, 10 Drawing Sheets

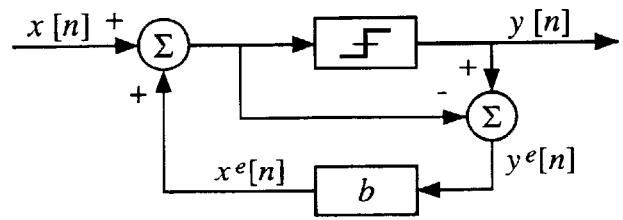
Figure 3: *(Prior Art)*
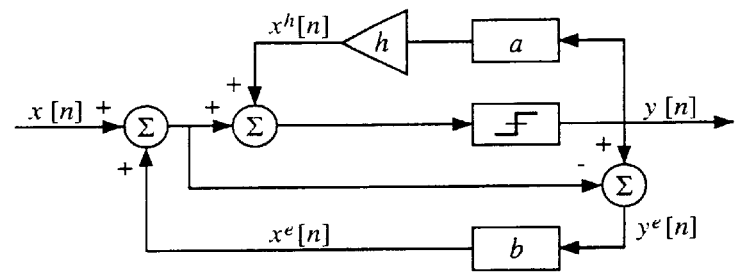
Figure 4: *(Prior Art)*
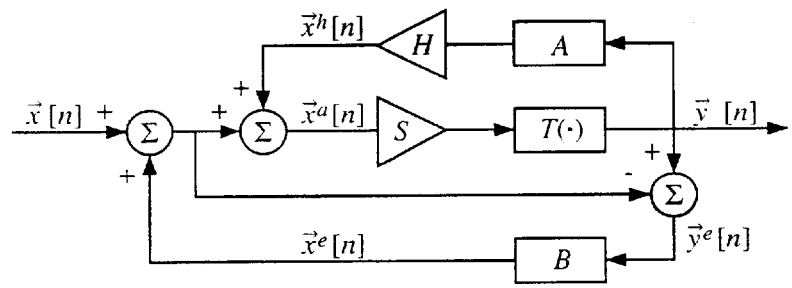
Figure 5:

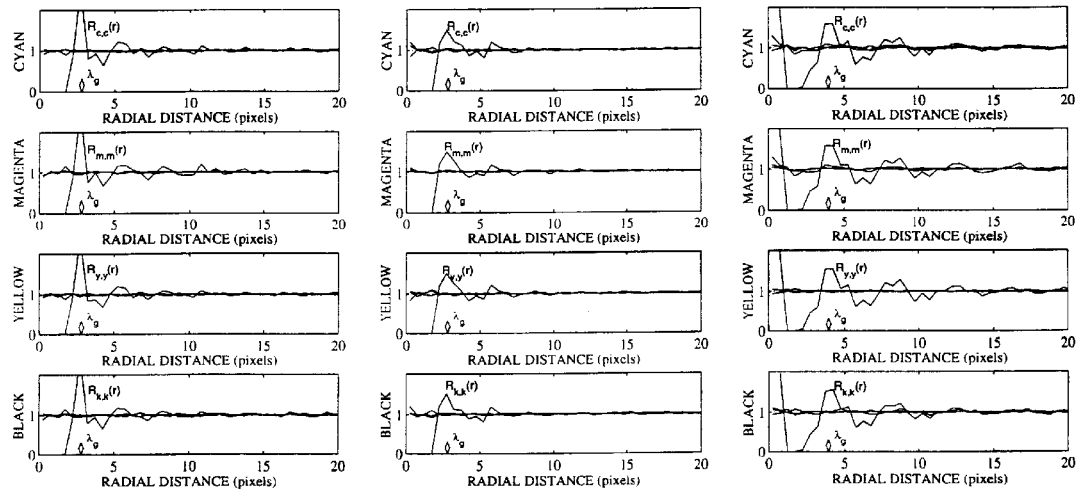
Figure 6: *(Prior Art)*
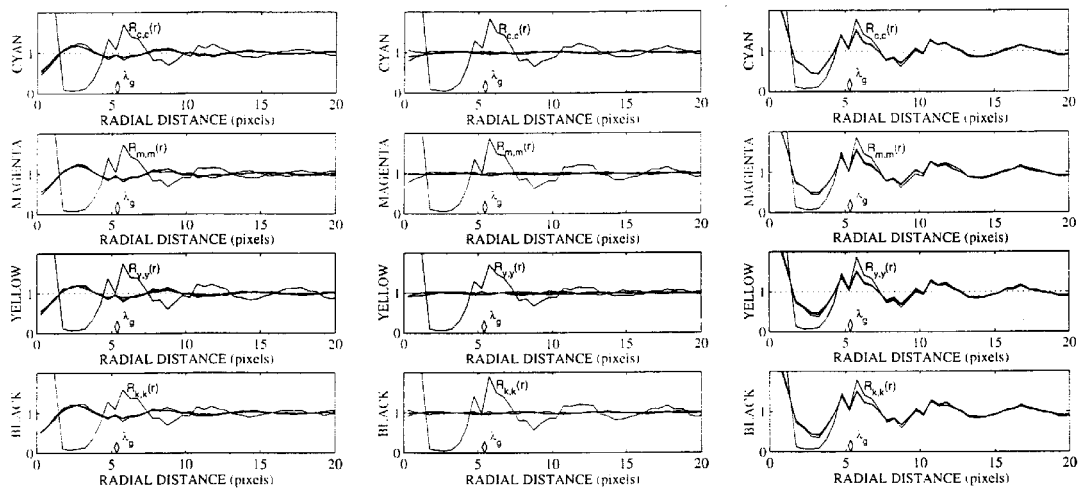
Figure 7: *(Prior Art)*

DIGITAL COLOR HALFTONING WITH GENERALIZED ERROR DIFFUSION VECTOR GREEN-NOISE MASKS

This application claims the benefit of Provisional application Ser. No. 60/117,415 filed Jan. 27, 1999.

BACKGROUND OF THE INVENTION

A. Field of the Invention

The present invention relates generally to halftoning of images, and, more particularly to digital color halftoning with generalized error diffusion and vector green-noise masks.

B. Description of the Related Art

Digital halftoning is a technique used by binary display devices to create, within the human eye, the illusion of continuous tone. Designed to mimic analog techniques, dot-clustered ordered dithering or amplitude modulated (AM) halftoning produces this illusion by varying the size of round printed dots which are arranged along an ordered grid. When using AM halftoning, the parameters of particular importance are the lines-per-inch (lpi), i.e., the number of rows/columns of the regular grid and the screen angle or the orientation of the regular grid relative to the horizontal axis. Typically, monochrome screens have an angle of 45° since the human visual system is least sensitive to diagonal artifacts.

In color printers, the illusion of continuous shades of color is produced by superimposing the binary halftones of cyan, magenta, yellow and black (CMYK) inks. As the dots of an AM halftone form a regular grid, clustered-dot dithering suffers from "moiré"—the secondary interference patterns created by superimposing two or more regular patterns. To minimize the appearance of moiré, the screens of cyan, magenta, yellow and black are typically oriented at the angles of 15°, 75°, 45°, and 0°, creating a pleasant rosette pattern.

The problems of moiré and screen angles are avoided in frequency-modulated halftoning where continuous tone is produced by varying the distance between printed dots and not varying the size. Typically, FM halftones are produced by error diffusion which creates a stochastic arrangement of dots. Besides avoiding moiré, FM halftoning, by isolating minority pixels, maximizes the spatial resolution of the printed image relative to the printer. Unfortunately, this distribution also maximizes the perimeter-to-area ratio of printed dots, making FM halftones more susceptible to printer distortions such as dot-gain, and causing the printer halftone to appear darker than the original ratio of white-to-black pixels. In printers with high dot-gain characteristics, AM halftoning may be the preferred technique, with its lower spatial resolution, moiré, and perimeter-to-area ratio of its clustered-dots.

An alternative to AM and FM halftoning is disclosed in R. Levien, "Output dependent feedback in error diffusion halftoning," IS&T's Eighth International Congress on Advances in Non-Impact Printing Technologies, pp. 280–282 (1992). Error diffusion with output-dependent feedback is an AM-FM hybrid which creates the illusion of continuous tone by producing a stochastic patterning of dot clusters which vary in both their size and in their separation distance. The major advantage of this technique over prior error diffusion schemes, is that by adjusting a single parameter, the output is tunable, that is, capable of creating halftones with large clusters in printers with high dot-gain characteristics and small clusters in printers with low dot-gain characteristics. Error diffusion with output-dependent feedback, therefore, sacrifices halftone visibility for printer robustness.

In U.S. patent application Ser. No. 09/228,573, filed Jan. 11, 1999, which was based upon provisional Serial No. 60/071,649, filed Jan. 16, 1998, the inventors of the present invention disclosed a technique that creates patterns described in terms of their spectral content as green-noise-containing no low or high frequency spectral components. This green-noise model is presented in accordance with a blue-noise model that describes the spectral characteristics of the ideal error-diffused halftone patterns as having no low-frequency content. Furthermore, just as the spectral characteristics of blue-noise generate the blue-noise mask and a binary dither array reduces the computational complexity associated with FM halftoning, the present inventors, using the spatial and spectral characteristics of green-noise, introduced the green-noise mask.

The problem yet to be addressed in the evolution of green-noise halftoning is its application to color. FM halftoning has been studied in great detail with respect to color printing. The techniques introduced range from simply halftoning each color independently, to complex model-based techniques which transform the CMYK color space to alternate spaces, and even using a blue-noise mask for color halftoning.

SUMMARY OF THE INVENTION

An object of the invention is to address the problems associated with the related art.

A further object is to provide an apparatus capable of digital color halftoning with generalized error diffusion and vector green-noise masks.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, the invention comprises an apparatus and method of color printing using green-noise halftoning, the method comprising the step of: extending error diffusion with output-dependent feedback to cluster pixels of like color and to regulate the clustering of pixels of different colors, wherein the halftoning of different colors is correlated such that the superimposing of different inks is increased or decreased, offering greater control of resulting halftone patterns.

To further achieve the objects, the present invention comprises an apparatus and method of color printing using green-noise halftoning, the method comprising the step of: incorporating a desired correlation between colors to construct a vector green-noise mask, wherein the mask maintains all the desirable attributes of a monochrome mask, such as isotropic and tunable coarseness, while regulating the overlapping of pixels of different colors.

To still further achieve the objects, the present invention comprises an apparatus and method of color printing, comprising the step of: extending error diffusion to regulate the overlapping of different colored pixels, wherein the halftoning of different colors is correlated such that the superimposing of different inks is increased or decreased, offering greater control of the resulting halftone pattern.

To further achieve the objectives, the present invention comprises an apparatus and method of color printing, where $\{\phi_{i,gi}: i=1, 2, \ldots, C\}$ is an initial set of empty M×N arrays, and C, M and N are integers, the method comprising the steps of: creating a set of M×N arrays, $\{U_1, U_2, \ldots, U_C\}$, of uniformly distributed random numbers such that $U_i[m, n] \in (0, 1)$ is the probability that $\phi_{i,gi}$ will become a minority pixel; for each pattern $\phi_{i,gi}$, where the ratio of the total number of minority pixels to the total number of pixels is less than a gray level $g_i$, performing the following substeps: constructing a concentration matrix $CM_i$ using a user-defined mapping of, $\{H_{LP}(\widehat{x})\phi_{i,gi}\}$, the output after filtering $\phi_{i,gi}$ with the low-pass filter $H_{LP}$ using circular convolution, locating the majority pixel in $\phi_{i,gi}$ with the highest modified probability, and replacing that pixel, $\phi_{i, gi}[m, n]$, with a minority pixel, and given the new minority pixel, $\phi_{i, gi}[m, n]$, adjusting the probability of each and every majority pixel, $\phi_{i, gi}[o, p]$ for l=1, 2, ..., C, such that: $(U_l[o, p])_{new} = (U_l[o, p])_{old} \times R_{l, i}(r)$ where r is the minimum wrap-around distance from the majority pixel $\phi_{i, gi}[o, p]$ to the new minority pixel $\phi_{i,gi}[m, n]$; and obtaining the desired color dither pattern given by the set $\{\phi_{i,gi}: i=1, 2, \ldots, C\}$ if for all colors i, the ratio of the total number of minority pixels to the total number of pixels in $\phi_{i,gi}$ is equal to $g_i$, otherwise, returning to the locating substep.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings:

FIG. 3 is a schematic diagram showing the error diffusion algorithm introduced by Floyd-Steinberg;

FIG. 4 is a schematic diagram showing the error diffusion with output-dependent feedback algorithm introduced by Levien;

FIG. 5 is a schematic diagram showing the generalized error diffusion algorithm in accordance with a preferred embodiment of the present invention;

FIG. 6 are graphs showing the pair correlations for CMYK halftone patterns with no diffusion between colors using Floyd-Steinberg error diffusion weights and no hysteresis (left), Levien diffusion with small hysteresis constant (h=0.5) (center), and Levien diffusion with medium hysteresis constant (h=1.0) (right);

FIG. 7 are graphs showing the pair correlations for CMYK halftone patterns using Levien diffusion with high hysteresis constant (h=1.5) with a negative interference term $(S_{i \ne i} = -0.2)$ (left), no interference term $(S_{i \ne i} = 0)$ (center), and a positive interference term $(S_{i \ne i} = +0.2)$ (right);

DESCRIPTION OF THE PREFERRED EMBODIMENTS

Reference will now be made in detail to the present preferred embodiments of the invention, examples of which are illustrated in the accompanying drawings. Wherever possible, the same reference numbers will be used throughout the drawings to refer to the same or like parts.

A. Halftone Statistics

Point process statistics have a long history in stochastic geometry and were recently introduced to digital halftoning by the present inventors for the study of aperiodic dither patterns. In this framework, $\Phi$, is a stochastic model governing the location of points in $\Re^2$. $\phi$, a sample of $\Phi$, is the set $\{x_i: i=1, 2, \ldots\}$ where $x_i$ is a point in $\Re^2$, and the scalar quantity $\phi(B)$ represents the number of $x_1$'s in B, a subset of $\Re^2$. In terms of a monochrome digital halftone pattern, a point is defined to be a minority pixel (a white pixel (1) for gray level $0 \le g < \frac{1}{2}$ and a black pixel (0) for $\frac{1}{2} \le g \le 1$).

So given $I_g$, a binary dither pattern representing a monochrome image of constant gray level g, $\phi[n]=1$ indicates that the pixel $I_g[n]$ is a minority pixel, otherwise, $\phi[n]=0$. As a random quantity, the first order moment or the expected value of $\phi[n]$ is its intensity I[n], which is the unconditional probability that $I_g[n]$ is a minority pixel with I[n]=g for $0 \le g \le \frac{1}{2}$ and I[n]=1-g for $\frac{1}{2} \le g \le 1$. For a stationary point process where the statistical properties of $\Phi$ are independent of n, I[n]=I.

A second metric for characterizing the statistical properties of $\Phi$ is the reduced second moment measure K[n;m] defined as:

$$K[n; m] = \frac{E(\Phi[n]|\Phi[m] = 1)}{E(\Phi[n])} \quad (1)$$

the ratio of the probability that pixel $I_g[n]$ is a minority pixel under the condition that $I_g[m]$ is a minority pixel to the unconditional probability that $I_g[n]$ is a minority pixel. K[n;m] can be interpreted as a measure of the influence of a minority pixel at m on the pixel $I_g[n]$ with K[n;m]>1 indicating that $I_g[n]$ is more likely to be a minority pixel given $I_g[m]$ and K[n;m]<1 indicating that $I_g[n]$ is less likely to be a minority pixel. K[n,m]=1 indicates that $I_g[m]$ has no influence on $I_g[n]$, and in the case of a dither pattern constructed from uncorrelated (white) noise, K[n;m]=1 for all n and m.

Figure 1:
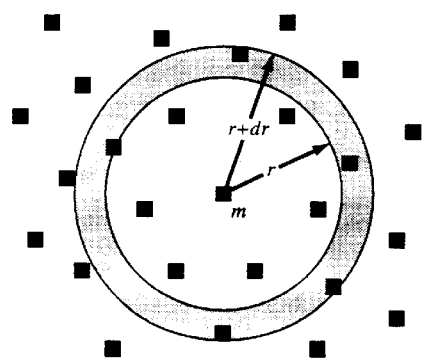
FIG. 1 is a diagram showing a spatial ring used to calculate a pair correlation for a binary dither pattern.

For a stationary point process, $K[n;m]=K(r, \theta)$, where r is the distance from m to n and $\theta$ is the direction. For an isotropic point process, the statistical properties of $\Phi$ are invariant to rotation, and therefore, $K(r,\theta)$ for an isotropic process is written as $R(r)$ and is referred to as the pair correlation. $R(r)$ is explicitly defined as:

$$R(r) = \frac{E(\phi(R_m(r)) \mid \phi[m] = 1)}{E(\phi(R_m(r)))} \quad (2)$$

the ratio of the expected number of minority pixels located in the ring $R_m(r)=\{n:r<|n-m|\leq r+dr\}$, see FIG. 1, under the condition that $I_g[m]$ is a minority pixel to the unconditional expected number of minority pixels located in $R_m(r)$.

Figure 2:
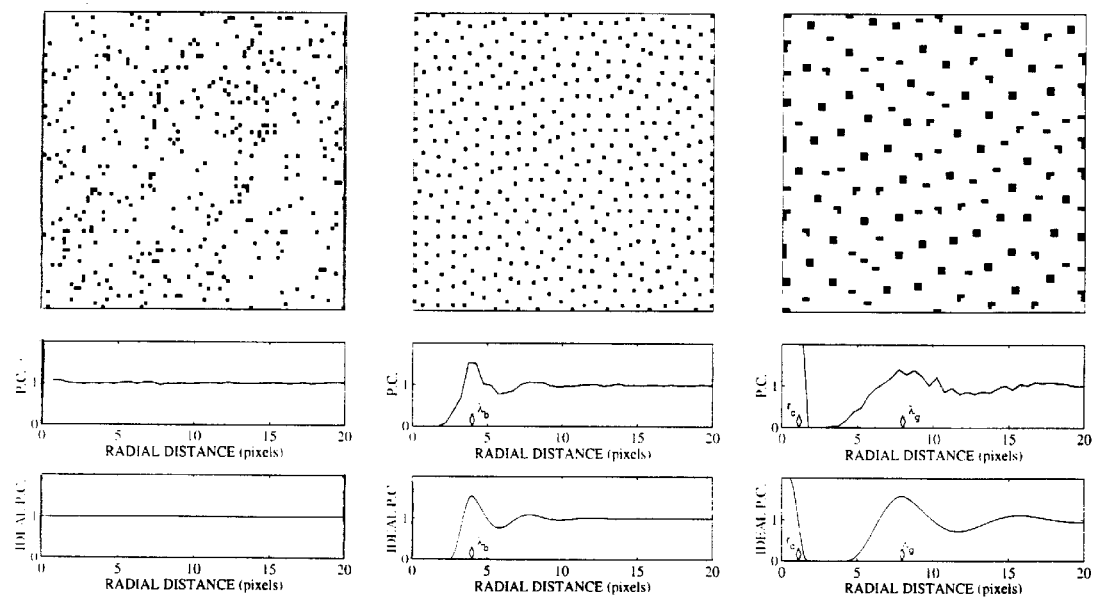
FIG. 2 are graphs showing the pair correlations for white noise (left), blue-noise (center), and green-noise (right) dither patterns.

$R(r)$ offers an especially useful tool for characterizing aperiodic dither patterns as illustrated in FIG. 2, where three dither patterns representing gray level $g=15/16$ are shown with their corresponding pair correlations (both the calculated and the ideal). The first pattern (left) is a white-noise dither pattern, and as such has a pair correlation $R(r)=1$ for all r as the value of any single pixel in $I_g$ is independent of all other pixels. The name (white-noise) derives from the fact that the resulting power spectrum remains constant for all frequencies.

The second pattern (center) is composed of blue-noise which represents gray level g by distributing the minority pixels within $I_g$ as homogeneously as possible-resulting in a dither pattern where minority pixels are placed, on average, a distance of $\lambda_b$ apart where:

$$\lambda_b = \begin{cases} D/\sqrt{g}, & \text{for } 0 < g \leq 1/2 \\ D/\sqrt{(1-g)}, & \text{for } 1/2 < g \leq 1 \end{cases} \quad (3)$$

and D is the minimum distance between addressable points on the display. Referred to as the principle wavelength of blue-noise, $\lambda_b$ is illustrated in $R(r)$ as series of peaks at integer multiples of $\lambda_b$. The term "blue-noise" denotes that the spectral components of a blue-noise dither pattern lie almost exclusively in the high (blue) frequency range.

The final pattern (right) is green-noise where gray level g is represented by homogeneously distributed minority pixel clusters. These clusters are separated, center-to-center, by an average distance of $\lambda_g$, the principle wavelength of green-noise, where:

$$\lambda_g = \begin{cases} D/\sqrt{g/\bar{M}}, & \text{for } 0 < g \leq 1/2 \\ D/\sqrt{(1-g)/\bar{M}}, & \text{for } 1/2 < g \leq 1 \end{cases} \quad (4)$$

and $\bar{M}$ is the average number of minority pixels per cluster. In $R(r)$, it is the separation of clusters $\lambda_g$ that leads to a series of peaks at integer multiples of $\lambda_g$, and the clustering of minority pixels that leads to a non-zero component for r near zero with $R(r)>1$ for $0<r<r_c$. The parameter $r_c$ is the cluster radius and is related to $\bar{M}$ as:

$$\pi r_c^2 = \bar{M} \quad (5)$$

where $\pi r_c^2$ is the area covered by a circle with radius $r_c$. Principle wavelength $\lambda_g$ is most apparent in $R(r)$ when the variation in cluster size is small as increasing the variation leads to a "whitened" dither pattern where the peaks and valleys of $R(r)$ become blurred. The term "green" refers to the resulting patterns' predominantly mid-frequency spectral components with the blue-noise model a limiting case ($\bar{M}=1$).

1. Color Halftoning

In the case of a color halftone, the monochrome model $I_g$ must be revised as a dither pattern composed of C colors where, for generality, the quantity C is an arbitrary integer. For RGM and CMYK, where images are composed of the additive colors red, green and blue or the subtractive colors cyan, magenta, yellow and black, C=3 and 4, respectively. So for color images, the halftone pattern $I_g$ is now composed of the monochrome binary dither patterns $I_{g1}, I_{g2}, \ldots, I_{gc}$ where $g_i$ is the gray level of pattern $I_{gi}$ and $\phi_i$ is the corresponding point process.

In this new framework, the quantity $K_{i,j}[n;m]$ is a reduced second moment measure between colors such that:

$$K_{i,j}[n;m] = \frac{E(\phi_{gi}[n] \mid \phi_{gi}[m] = 1)}{E(\phi_{gi}[n])} \quad (6)$$

is the ratio of the conditional probability that $\phi_{gi}[n]$ is a minority pixel given that a minority pixel exists at sample m of $\phi_{gi}$ to the unconditional probability that $\phi_{gi}[n]$ is a minority pixel. Similar to $K[n;m]$, $K_{i,j}[n;m]=1$ indicates that the location of minority pixels in colors i and j are uncorrelated. The pair correlation between colors $g_i$ and $g_j$ follows as:

$$R_{i,j}(r) = \frac{E(\phi_{gi}(R_m(r)) \mid \phi_{gi}[m] = 1)}{E(\phi_{gi}(R_m(r)))} \quad (7)$$

the ratio of the expected number of minority pixels of color $g_i$ located in the ring $R_m(r)=\{n:r<|n-m|\leq r+dr\}$ under the condition that $\phi_{gi}[m]$ is a minority pixel to the unconditional expected number of minority pixels with color $g_i$ located in $R_m(r)$.

B. Generalized Error Diffusion

1. Monochrome

In error diffusion (FIG. 3), the output pixel y[n] is determined by adjusting and thresholding the input pixel x[n] such that:

$$y[n] = \begin{cases} 1, & \text{if } (x[n] + x^e[n]) \geq 0 \\ 0, & \text{else} \end{cases} \quad (8)$$

where $x^e[n]$ is the diffused quantization error accumulated during previous iterations as:

$$x^e[n] = \sum_{i=1}^{M} b_i^x y^e[n-i] \quad (9)$$

with $y^e[n]=y[n]-(x[n]+x^e[n])$ and $\sum_{i=1}^{M} b_i=1$. Using vector notation, Equation (9) becomes:

$$x^e[n] = b^T y^e[n] \quad (10)$$

where $b=[b_1, b_2, \ldots, b_M]^T$ and $y^e[n]=[y^e[n-1], y^e[n-2], \ldots, y^e[n-M]]^T$.

As shown in FIG. 4, adding an output-dependent feedback term, to Equation (8) provides:

$$y[n] = \begin{cases} 1, & \text{if } (x[n] + x^e[n] + x^h[n]) \geq 0 \\ 0, & \text{else} \end{cases} \quad (11)$$

where $x^h[n]$ is the hysteresis or feedback term defined as:

$$x^h[n] = h \sum_{i=1}^{M} a_i^* y[n-i] \qquad (12)$$

with $\sum_{i=0}^{N} \alpha_i = 1$ and h is an arbitrary constant. Referred to as the hysteresis constant, h acts as a tuning parameter with a larger h value leading to coarser output textures as h increases (h>0) or decreases (h<0) the likelihood of a minority pixel if the previous outputs were also minority pixels. Equation (12) can also be written in vector notation as:

$$x^h[n] = h a^T y[n] \qquad (13)$$

where $a=[\alpha_1, \alpha_2, \ldots, \alpha_N]^T$ and $y[n]=[y[n-1], y[n-2], \ldots, y[n-N]]^T$. The calculation of the parameters $y^e[n]$ and $x^e[n]$ remains unchanged. The binary output pixel $y[n]$ is determined as:

$$y[n] = \begin{cases} 1, & \text{if } (x[n] + b^T y^e[n] + h a^T y[n]) \geq 0 \\ 0, & \text{else} \end{cases} \qquad (14)$$

where $y^e[n]=[y^e[n-1], y^e[n-2], \ldots, y^e[n-N]]^T$ such that $y^e[n]=y[n]-(x[n]+x^e[n])$ and $y[n]=[y[n-1], y[n-2], \ldots, y[n-N]]^T$.

2. Color

Now consider the C-channel case where an output pixel is not the binary pixel $y[n]$ but the C-dimensional vector $\bar{y}[n]$ such that:

$$\bar{y}[n] = \begin{bmatrix} y_1[n] \\ y_2[n] \\ \vdots \\ y_c[n] \end{bmatrix} \qquad (15)$$

where $y_i[n]$ is the binary output pixel of color i. Assuming all C channels are halftoned independently, the binary output pixel $y_i[n]$ is determined as:

$$y_i[n] = \begin{cases} 1, & \text{if } (x_i[n] + x_i^e[n] + x_i^h[n]) \geq 0 \\ 0, & \text{else} \end{cases} \qquad (16)$$

where $x_i^e$ and $x_i^h[n]$ are the error and hysteresis terms respectively for the $i^{th}$ color. The error term, being a vector, is calculated as:

$$\bar{x}^e[n] = \begin{bmatrix} b^{T_1} & 0 & \cdots & 0 \\ 0 & b^{T_2} & \cdots & 0 \\ \vdots & \vdots & \ddots & \vdots \\ 0 & 0 & \cdots & b^{T_C} \end{bmatrix} \begin{bmatrix} y^{e_1}[n] \\ y^{e_2}[n] \\ \vdots \\ y^{e_C}[n] \end{bmatrix} \qquad (17)$$

where $b_i$ are the filter weights regulating the diffusion of error in the $i^{th}$ channel and $y^e_i[n]$ is the vector $[y^e_i[n-1], y^e_i[n-2], \ldots, y^e_i[n-N]]^T$ composed exclusively from errors in channel i such that $y^e_i[n]=y_i[n]-(x_i[n]+x^e_i[n])$. The hysteresis term $\bar{x}^h[n]$, also a vector, is calculated as:

$$\bar{x}^h[n] = \begin{bmatrix} h_1 & 0 & \cdots & 0 \\ 0 & h_2 & \cdots & 0 \\ \vdots & \vdots & \ddots & \vdots \\ 0 & 0 & \cdots & h_C \end{bmatrix} \begin{bmatrix} a_1 & 0 & \cdots & 0 \\ 0 & a_2 & \cdots & 0 \\ \vdots & \vdots & \ddots & \vdots \\ 0 & 0 & \cdots & a_C \end{bmatrix} \begin{bmatrix} y_1[n] \\ y_2[n] \\ \vdots \\ y_C[n] \end{bmatrix} \qquad (18)$$

where $a_i$ are the filter weights and $h_i$ is the hysteresis constant that regulates the diffusion of feedback in the $i^{th}$ channel.

Generalized even further, Equation (17) becomes:

$$\bar{x}^e[n] = \begin{bmatrix} b^{T_{1,1}} & b^{T_{1,2}} & \cdots & b^{T_{1,C}} \\ b^{T_{2,1}} & b^{T_{2,2}} & \cdots & b^{T_{2,C}} \\ \vdots & \vdots & \ddots & \vdots \\ b^{T_{C,1}} & b^{T_{C,2}} & \cdots & b^{T_{C,C}} \end{bmatrix} \begin{bmatrix} y^{e_1}[n] \\ y^{e_2}[n] \\ \vdots \\ y^{e_C}[n] \end{bmatrix} \qquad (19)$$

where quantization error can now be diffused between channels through $b_{i,j}$, the error filter weights which regulate the diffusion of error from channel j to channel i, and Equation (18) becomes:

$$\bar{x}^h[n] = \begin{bmatrix} h_{1,1} & h_{1,2} & \cdots & h_{1,C} \\ h_{2,1} & h_{2,2} & \cdots & h_{2,C} \\ \vdots & \vdots & \ddots & \vdots \\ h_{C,1} & h_{C,2} & \cdots & h_{C,C} \end{bmatrix} \begin{bmatrix} a^T_{1,1} & a^T_{1,2} & \cdots & a^T_{1,C} \\ a^T_{2,1} & a^T_{2,2} & \cdots & a^T_{2,C} \\ \vdots & \vdots & \ddots & \vdots \\ a^T_{C,1} & a^T_{C,2} & \cdots & a^T_{C,C} \end{bmatrix} \begin{bmatrix} y_1[n] \\ y_2[n] \\ \vdots \\ y_C[n] \end{bmatrix} \qquad (20)$$

where the previous outputs of channel j can impact all other channels where $h_{i,j} \neq 0$ for $i \neq j$ as $a_{i,j}$ and $h_{i,j}$ regulate the diffusion of feedback from channel j to i.

Another modification to error diffusion, as shown in FIG. 5, comprises first defining the thresholding function $T(\cdot)$ as:

$$\bar{y}[n] = T(\bar{x}[n] + \bar{x}^e[n] + \bar{x}^h[n]) \qquad (21)$$
$$= T(\bar{x}^a[n])$$

where $\bar{x}^a[n]=\bar{x}[n]+\bar{x}^e[n]+\bar{x}^h[n]$ is the accumulated input pixel. The C×C interference matrix S is added to Equation (21) as:

$$\bar{y}[n] = T(S\, \bar{x}^a[n]) \qquad (22)$$

such that $S_{i,j}$ is the influence on the thresholding function of color i by the accumulated input of color j. The effect of $S_{i,j}$ is to increase ($S_{i,j}>0$) or decrease ($S_{i,j}<0$) the likelihood of a minority pixel at $y_i[n]$ based on the likelihood of a minority pixel at $y_j[n]$. Finally, error diffusion is summarized by the generalized error diffusion equation:

$$\bar{y}[n] = T(S(\bar{x}[n] + B y^e[n] + HAY[n])). \qquad (23)$$

3. Simulations

Figure 12:
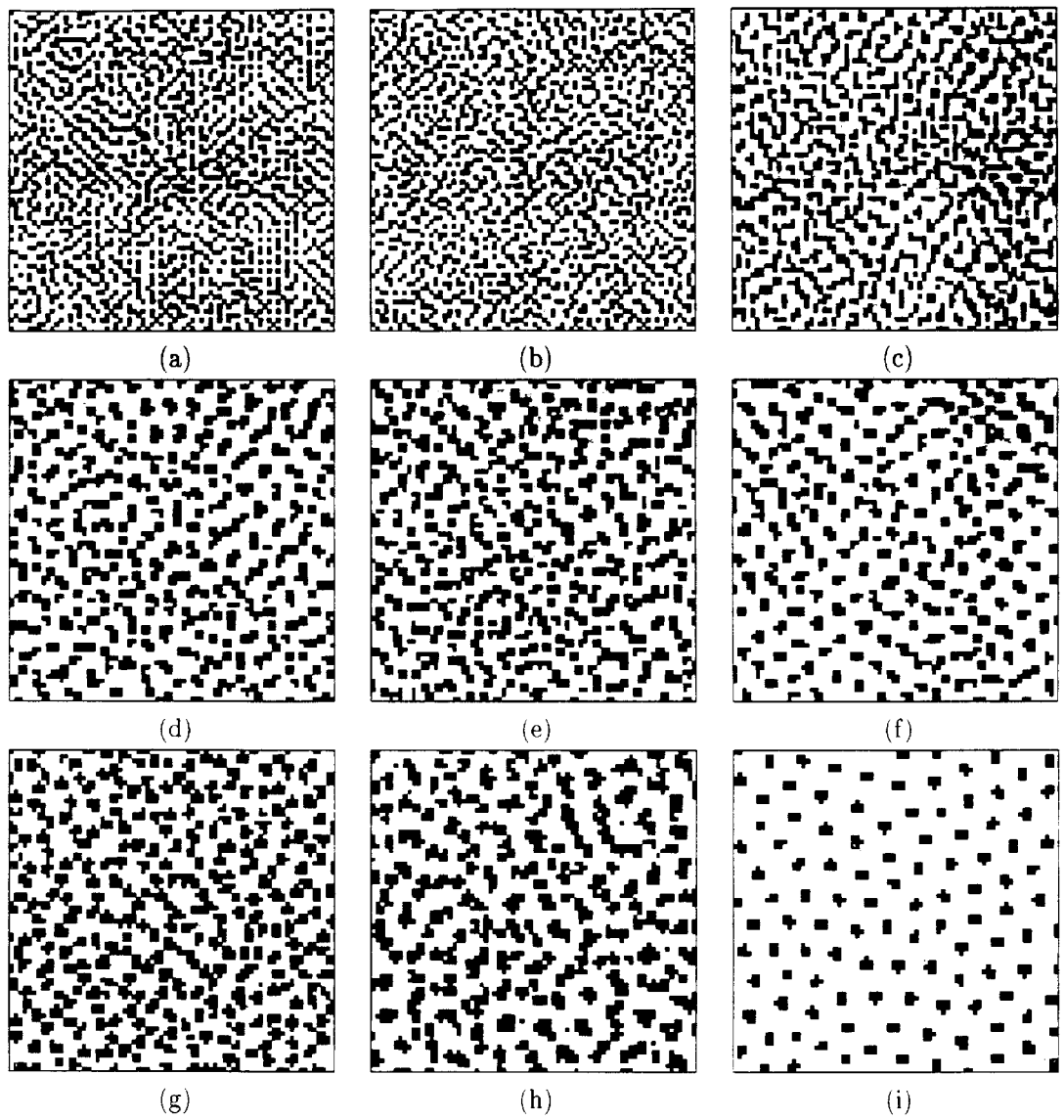
FIG. 12 shows CMYK dither patterns created via Floyd-Steinberg error diffusion (a), created via generalized error diffusion (b–f), and created via VBIPPCCA (g–i)

FIG. 12(a) shows the resulting CMYK dither patters created by halftoning a 96×96 pixel color image of a constant color value $\bar{x}[n]=[\frac{7}{8}, \frac{7}{8}, \frac{7}{8}, \frac{7}{8}]^T$ using the Floyd-Steinberg error filter weights with no hysteresis and no dependencies between colors. Before halftoning, low-level white-noise (VAR=0.01) was added to the first scan line of the original color image in order to minimize edge effects and also to unsynchronize the resulting dither patterns. Since this configuration involves colors that are halftone exactly the same way and with each color of the original image identical to the other colors, the resulting pattern of each color will also be identical (synchronized) to the other patterns. Therefore, adding a single or even a few lines of low-level noise eliminates this synchronization between colors, and adding several columns of white-noise also minimizes edge effects. Dither patterns created by error diffusion according to the present invention are the result of using a serpentine (left-to-right and right-to-left) raster scan on a continuous-tone image where low-level white-noise has been added to both the edge rows and columns. The half-toned images are then cropped to exclude those same rows and columns.

For a statistical analysis of the resulting dither pattern, FIG. 6 (left) shows four plots labeled cyan, magenta, yellow and black corresponding to the CMYK dither pattern in FIG. 12(a). Shown in the first plot (labeled cyan) is the pair correlation between colors cyan versus cyan ($R_{c,c}(r)$), cyan versus magenta ($R_{c,m}(r)$), cyan versus yellow $R_{c,y}(r)$) and cyan versus black ($R_{c,k}(r)$). The small diamonds placed along the horizontal axis indicate the principle wavelengths and cluster radii for $R_{c,c}(r)$. As would be expected for a monochrome image, the pair correlation $R_{c,c}(r)$ exhibits blue-noise characteristics as the pair correlation shows: (i) $R_{c,c}(r)<1$ for r near zero, (ii) a frequent occurrence of the interpoint distance $\lambda_g$, and (iii) a decreasing influence with increasing r. Having no diffusion between colors and zero interference (S=I, the identity matrix), the pair correlation between channels are predominantly flat as minority pixels of color i have no influence on minority pixels of color j. The remaining plots show similar relationships for colors magenta, yellow and black.

Also shown in FIG. 6 (center) are the resulting pair correlations for the CMYK dither pattern shown in FIG. 12(b) where Levien's error diffusion scheme has been implemented with a low hysteresis constant h=0.5, no diffusion between colors, and zero interference. With a low hysteresis constant, this scheme generates blue-noise patterns very similar to that generated using the Floyd-Steinberg filter weights.

FIG. 6 (right) (corresponding to the resulting pair correlations of the CMYK dither pattern shown in FIG. 12(c)) shows Levien's error diffusion scheme with a medium hysteresis constant h=1.0 where the patterns begin to exhibit clustering as the average size of a minority pixel cluster is 1.95 pixels. In each color, the pair correlation exhibits strong green-noise characteristics as each plot shows: (i) clustering as indicated by $R_{i,j}(r) \geq 1$ for $r \leq r_c(r_c=0.790)$, (ii) a frequent occurrence of the intercluster distance $\lambda_g=3.95$ and (iii) a decreasing influence with increasing r. As before with zero influence and no diffusion between colors, the pair correlations between colors remains predominantly flat for all values of r.

The dither patterns of FIG. 7 illustrate the effects of S, the interference matrix, with FIG. 7 (left) (corresponding to the resulting pair correlations of the CMYK dither pattern shown in FIG. 12(d)) showing the case where S is the matrix defined by $S_{i,j}=1$ for i=j and $S_{i,j}=-0.2$ for i≠j. In this specific instance, S has the effect of minimizing the superposition of minority pixels of different colors. That is, given that a cyan pixel is very likely to be printed, minority pixels for magenta, yellow and black are less likely to be printed at the same pixel location. This behavior is well illustrated in the pair correlations where $R_{i,j}<1$ for $R_{i,j}>1$. For comparison, FIG. 7 (center) (corresponding to the resulting pair correlations of the CMYK dither pattern shown in FIG. 12(e)) shows the case where S is the identity matrix (no interference) with a flat pair correlation between minority pixels of different colors. For further comparison, FIG. 7 (center) (corresponding to the resulting pair correlations of the CMYK dither pattern shown in FIG. 12(f)) shows the case where S is the matrix defined by $S_{i,j}=1$ for i=j and $S_{i,j}+0.2$ for i≠j. Here, the effect of S is to increase the superposition of minority pixels, such that a minority pixel of color i with a high likelihood of being printed, makes a minority pixel of any color j more likely.

C. Vector Green-Noise Masks

The green-noise mask is a novel approach to dither array screening where a continuous-tone image is converted to a binary halftone image by performing a pixel-wise comparison between the original and the dither array or mask. Previously, halftoning with green-noise has employed error diffusion-based methods which although are tunable (capable of creating halftone patterns with large clusters for printers with high dot-gain characteristics and small clusters for printers with low dot-gain characteristics) carry a high computational cost. Now through the use of a green-noise mask, halftoning can create a stochastic patterning of dots with adjustable coarseness but with the same computational freedom as ordered-dither halftoning schemes.

As set forth in U.S. patent application Ser. No. 09/228,573 for monochrome images, the disclosure of which is herein incorporated by reference, the green-noise mask is defined by the set, $\{\phi_g: 0 \leq g \leq 1\}$, of M×N binary green-noise dither patterns with one pattern, $\phi_g$, corresponding to each possible discrete gray level g (256 patterns for 8-bit gray-scale images). This set satisfies the stacking constraint that for any two gray-levels k and g with k<g, $\phi_k \subset \phi_g$(if $\phi_k[m, n]=1$, then $\phi_g[m, n]=1$). As a consequence, a pixel of the M×N dither array or mask DA[m, n ] is defined simply as the minimum g of which $\phi_g[m, n]=1$. The size parameters $\overline{M}$ and N are arbitrary integers with larger masks constructed by tiling edge-to-edge the original M×N mask such that the output pixel, y[m, n], after halftoning the input pixel, x[m, n], is defined as:

$$y[m,\ n] = T(x[m,\ n] - DA[\mathrm{mod}_M(m),\ \mathrm{mod}_N(n)]) \quad (24)$$

where T is the thresholding function of Equation (21).

For color halftoning, the vector green-noise mask is defined by the set $\{\phi_{c,\ g}: c=1, 2, \ldots, C \text{ and } 0<g<1\}$, where $\phi_{c,\ g}$ is the binary green-noise dither pattern for color c and intensity level g (for 24-bit RGB color this corresponds to 256 patterns per channel or 3×256 total patterns). Like the monochrome set, this set must also satisfy the stacking constraint but only within a given color such that $\phi_{c,\ g}[m, n]=1$ if $\phi_{c,\ k}[m, n]=1$ for color c and intensity levels k and g with k<g. A pixel, $\overline{DA}[m, n]$, of the vector green-nosie mask is therefore defined as:

$$\overline{DA}[m,n] = \begin{bmatrix} \min\{g : \phi_{1,g}[m, n] = 1\} \\ \min\{g : \phi_{1,g}[m, n] = 1\} \\ \vdots \\ \min\{g : \phi_{1,g}[m, n] = 1\} \end{bmatrix} \quad (25)$$

where the output after halftoning is defined by:

$$\overline{y}[m,\ n] = T(\overline{x}[m,\ n] - \overline{DA}[\mathrm{mod}_M(m),\ \mathrm{mod}_N(n)]) \quad (26)$$

1. Monochrome BIPPCCA

The physical construction of binary dither patterns for the monochrome green-noise mask is done through Binary Pattern Pari Correlation Construction Algorithm ("BIPPCCA"). The basic premise of BIPPCCA is to take an empty array (containing no minority pixels), and assign to each element a probability of that element becoming a minority pixel. BIPPCCA then converts the most likely elements to minority pixels, one at a time, until the ratio of black to white pixels is g, the desired gray level. The most likely element is the majority pixel with the highest probability during the current iteration. In order for the resulting dither pattern to have the desired statistical properties (i.e., a desired pair correlation), BIPPCCA adjusts, at each iteration, the probability of each majority pixel in the array according to the current set of minority pixels.

In BIPPCCA, the initial assignment of probabilities is done in an uncorrelated manner, but as each new minority pixel is added, the probabilities of all neighboring majority pixels are adjusted according to the desired pair correlation of the resulting pattern. As R (r) is a function of the radial distance between pixels, a majority pixel's probability is increased if its radial distance from the newest minority pixel r corresponds to R(r)>1 and decreased if r corresponds to R(r)<1. As an example, consider using BIPPCCA to construct a blue-noise pattern where the pair correlation is zero for r near zero. This feature of R(r) is achieved in BIPPCCA if for each new minority pixel, the probability of every element directly adjacent thereto is set to zero, and as R(r) has a peak at blue-noise principle wavelength $\lambda_b$, all elements a distance $\lambda_b$ from each new minority pixel are increased to ensure a peak exists in the pair correlation of the final pattern.

Figure 8:
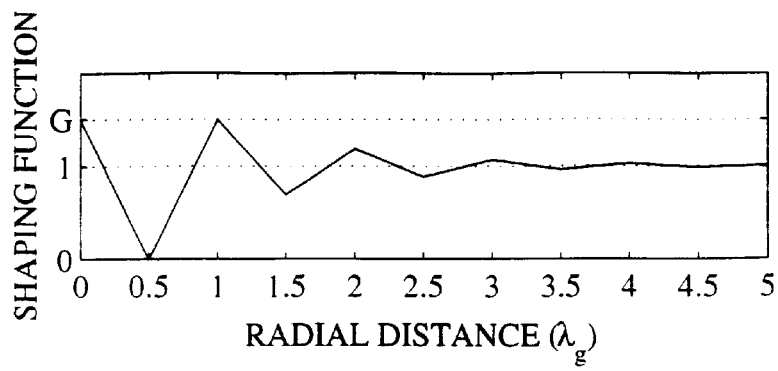
FIG. 8 is a graph showing a pair correlation shaping function used to construct green-noise.

In BIPPCCA, how much to increase or decrease a given probability is defined according to pair correlation shaping function R(r). R(r) is a user-defined function based on the desired pair correlation. FIG. 8 shows the shaping function used by the present inventors to construct green-noise dither patterns. This function has peaks at integer multiples of the green-noise principle wavelength $\lambda_g$, and valleys halfway between. The parameter G is a tuning parameter that creates visually pleasing patterns when G=1.1. Being piecewise linear, this pair correlation shaping function is an especially simple approximation of the pair correlation of the ideal green-noise pattern for a given gray level and cluster size, but when used alone the resulting dither patterns tend to look noisy and non-stationary.

Because stationarity is a necessary property for digital halftoning, the most likely pixel will no longer be the majority pixel with the highest probability, but instead be the majority pixel with the highest product U[m, n]×CM[m, n]. U[m, n] is the probability of a given pixel, and CM[m, n] is a function of the density of minority pixels within the surrounding area. Referred to as the concentration matrix, CM makes majority pixels more likely to become minority pixels in areas of low minority pixel concentration and less likely in areas of high minority pixel concentration.

Figure 9:
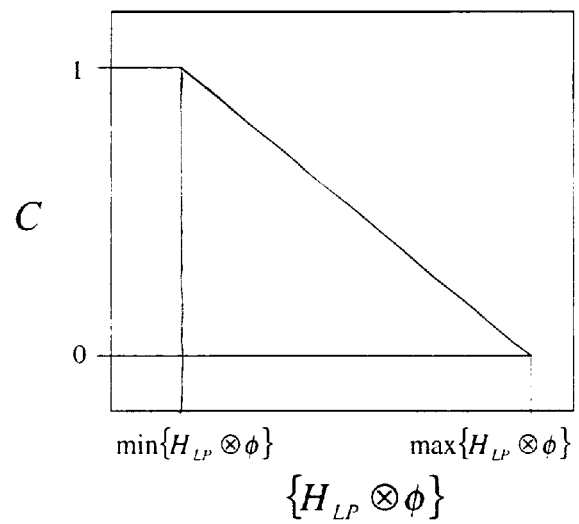
FIG. 9 is graph showing a mapping function used to construct a concentration matrix from an output after filtering with a low-pass filter using circular convolution.

In BIPPCCA, the concentration of minority pixels is measured as the output after applying a low-pass filter, $H_{LP}$, using circular convolution. In U.S. patent application Ser. No. 09/228,573, the present inventors construct green-noise patterns using the Gaussian filter, $H_{LP}$, defined as:

$$H_{LP}(r) = \exp\left(-\frac{r^2}{\lambda^2 g}\right) \quad (27)$$

where $H_{LP}$, has a wide-spread impulse response for large $\lambda_g$, clusters are far apart, and a narrow-spread impulse response for small $\lambda_g$, where clusters are close together. The user then determines the increase or decrease in a probability according to the minority pixel concentration by mapping the filtered output to the concentration matrix. FIG. 9 shows the mapping of concentration values used in Ser. No. 09/228, 573 to determine CM, where $\{H_{LP}\circledx \phi_g\}$ represents the output after filtering the binary dither pattern of the current iteration, $\phi_g$, with the low-pass filter $H_{LP}$. In this mapping, values of $\{H_{LP}\circledx\phi_g\}$ are scaled in a linear fashion such that max $\{H_{LP}\circledx\phi_g\}\to 0$ and min $\{H_{LP}\circledx\phi_g\}\to 1$.

In summary, the steps for monochrome BIPPCCA are performed as follows where $\phi_g$ is initially an M×N array with no minority pixels:

Step 1: Create an M×N array, U, of uniformly distributed random numbers such that U[m, n]∈[0, 1] is the probability that $\phi_g$[m, n] will become a minority pixel.

Step 2: Construct the concentration matrix CM using a user-defined mapping of $\{H_{LP}\circledx\phi_g\}$, the output after filtering $\phi_g$ with the low-pass filter $H_{LP}$ using circular convolution, and then locate the majority pixel in $\phi_g$ with the highest modified probability (the majority pixel $\phi_g$[m, n] such that U[m, n]×CM[m, n]>U[o, p]×CM[o, p] for all 1≤o≤M and 1≤p≤N where $\phi_g$[o,p] is also a majority pixel). Replace that pixel, $\phi_g$[m, n], with a minority pixel.

Step 3: Given the new minority pixel, $\phi_g$[m, n], adjust the probability of each and every majority pixel, $\phi_g$[o, p], such that:

$$(U[o,p])_{new} = (U[o,p])_{old} \times R(r) \quad (28)$$

where r is the minimum wrap-around distance from the majority pixel $\phi_g$[o,p] to the new minority pixel $\phi_g$[m, n] defined for an M×N array as:

$$r = \sqrt{\min(|m-o|, M-|m-o|)^2 + \min(|n-p|, N-|n-p|)^2} \quad (29)$$

Step 4: If the ratio of the total number of minority pixels to the total number of pixels in $\phi_g$ is equal to the desired gray-level g, then quit with the desired dither pattern given by $\phi_g$; otherwise, return to step 2.

BIPPCCA should be constrained to create a pattern $\phi_g$ constructed to have as a subset, all constructed patterns $\phi_k$ for which k<g. $\phi_g$ must also be a subset of all constructed patterns $\phi_l$ for which l>g.

The first of these two constraints is satisfied by first initializing $\phi_g$ to $\phi_k$ and applying step 3 for each and every minority pixel in $\phi_k$ probability matrix U of uniformly distributed random numbers. BIPPCCA then continues at step 4. The second constraint is satisfied in step 2 of BIPPCCA when locating the maximum likely majority pixel by considering only those majority pixels in $\phi_g$ which correspond to minority pixels in the constructed patterns, $\phi_l$ for which l>g.

In applying this constrained BIPPCCA to mask design, the patterns composing the set $\{\phi_g: 0\leq g \leq 1\}$ can be constructed in an order and that order has an impact on the construction of each pattern as $\phi_g$ is constrained by the constructed pattern corresponding to the maximum gray level which is less than g and constrained by the constructed pattern corresponding to the minimum gray level which is greater than g. As an example, when constructing green-noise masks, use the inter-leaved ordering:

$$0, 1, \frac{1}{4}, 1-\left(\frac{1}{4}\right), \frac{1}{4}+\Delta, 1-\left(\frac{1}{4}+\Delta\right),$$

$$\frac{1}{4}+2\Delta, 1-\left(\frac{1}{4}+2\Delta\right), \ldots, \frac{1}{2}, \frac{1}{4}-\Delta, 1-\left(\frac{1}{4}-\Delta\right),$$

$$\frac{1}{4}-2\Delta, 1-\left(\frac{1}{4}-2\Delta\right), \ldots, \Delta, 1-\Delta$$

where $\Delta = 1/255$.

2. Color BIPPCCA

The physical construction of binary dither patterns for the vector green-noise mask is done through Vector Binary Pair Correlation Construction Algorithm ("VBIPPCCA"). In color, a binary dither pattern representing the color $g=[g_1, g_2, \ldots, g_C]^T$ is defined by the set of monochrome images $\{\phi_{1,g_1}, \phi_{2,g_2}, \ldots, \phi_{C,g_C}\}$ where $\phi_{i,gi}$ is the binary dither pattern corresponding to the $i^{th}$ color with intensity $g_i$. VBIPPCCA constructs these monochrome images according to the previous algorithm. However, unlike BIPPCCA, when a minority pixel is added to the $i^{th}$ color, the probabilities corresponding to majority pixels of color j are adjusted according to $R_{j,i}(r)$, the desired pair correlation between minority pixels of color j and i. For each minority cyan pixel added to a CMYK dither pattern, BVIPPCCA uses the user-defined shaping functions $R_{c,c}(r)$, $R_{m,c}(r)$, $R_{y,c}(r)$ and $R_{k,c}(r)$ to adjust the probabilities of majority pixels in the cyan, magenta, yellow and black colors, respectively.

Because stationarity is also a desired property for digital color halftoning, VBIPPCCA applies CM just as in the monochrome case with each color filtered independently of the others. Returning to the CMYK case, this implies that the maximum likely majority pixel of the cyan color is the majority pixel of the cyan color with the highest product $U_c[m,n] \times CM_c[m,n]$, where $U_c[m,n]$ is the probability array for cyan pixels, and $CM_c[m,n]$ is the concentration matrix formed by applying a user-defined mapping to the concentration of minority cyan pixels.

Figure 15:
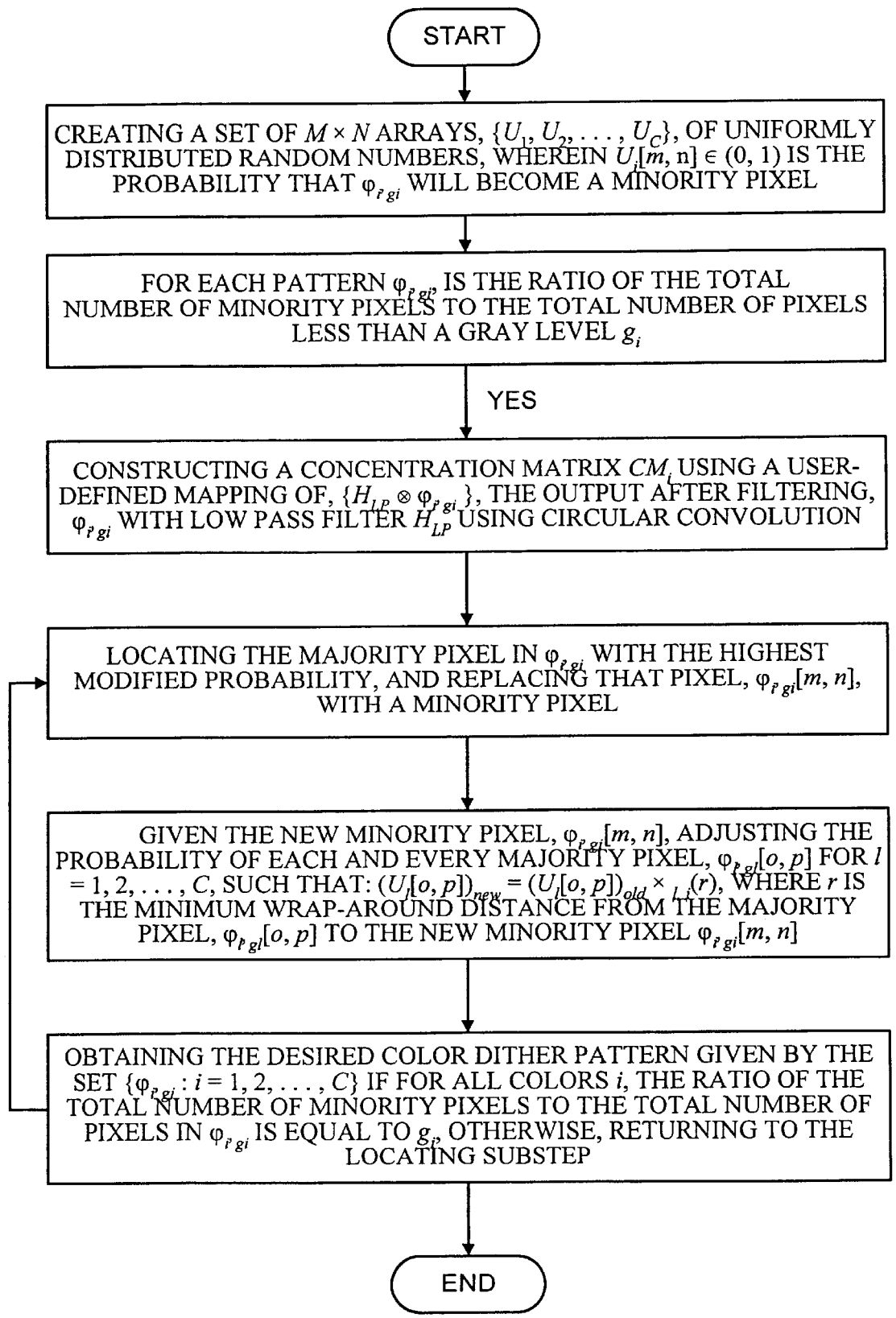
FIG. 15 is a flow chart showing the steps involved in the VBIPPCCA process.

In summary, the steps for VBIPPCCA as shown in FIG. 15, are performed as follows, where $\{\phi_{i,gi}: i=1, 2, \ldots, C\}$ is the initial set of empty M×N arrays:

Step 1: Create a set of M×N arrays, $\{U_1, U_2, \ldots, U_C\}$, of uniformly distributed random numbers such that $U_i[m,n] \in (0, 1)$ is the probability that $\phi_{i,gi}$ will become a minority pixel.

Step 2: For each pattern $\phi_{i,gi}$, where the ratio of the total number of minority pixels to the total number of pixels is less than $g_i$:

(a) Construct the concentration matrix $CM_i$ using a user-defined mapping of $\{H_{LP} \otimes \phi_{i,gi}\}$, the output after filtering $\phi_{i,gi}$ with the low-pass filter $H_{LP}$ using circular convolution.

(b) Locate the majority pixel in $\phi_{i,gi}$ with the highest modified probability (the majority pixel $\phi_{i,gi}[m,n]$ such that $U_i[m,n] \times Cm_i[m,n] > U_i[o,p] \times Cm_i[o,p]$ for all $1 \leq o \leq M$ and $1 \leq p \leq N$ where $\phi_{i,gi}[o,p]$ is also a majority pixel), and replace that pixel, $\phi_{i,gi}[m,n]$, with a minority pixel.

(c) Given the new minority pixel, $\phi_{i,gi}[m,n]$, adjust the probability of each and every majority pixel, $\phi_{l,gl}[o,p]$ for $l=1, 2, \ldots, C$, such that:

$$(U_l[o,p])_{new} = (U_l[o,p])_{old} \times R_{l,i}(r) \quad (30)$$

where r is the minimum wrap-around distance from the majority pixel $\phi_{l,gl}[o,p]$ to the new minority pixel $\phi_{i,gi}[m,n]$.

Step 3: If for all colors i, the ratio of the total number of minority pixels to the total number of pixels in $\phi_{i,gi}$ is equal to $g_i$, the desired intensity of color i, then quit with the desired color dither pattern given by the set $\{\phi_{i,gi}: i=1, 2, \ldots, C\}$; otherwise, continue at step 2b.

VBIPPCCA should satisfy the same constraints as BIPPCCA in order to be used for mask construction. The first of these two constraints, $\phi_{i,gi} \subset \phi_{i,ki}$ is satisfied by initializing $\phi_{i,gi}$ to $\phi_{i,ki}$ and applying Step 2(c) for each and every minority pixel in $\phi_{i,ki}$. VBIPPCCA can then continue to Step 3. The second constraint is satisfied in Step 2(b) of VBIPPCCA when locating the maximum likely majority pixel in color i by considering only those majority pixels in $\phi_{i,gi}$ that correspond to minority pixels in the constructed patterns, $\phi_{i,li}$ for which $l > g$. Note that with these constraints, patterns of the vector green-noise mask can be constructed in any order, and the order with which patterns of any color i are constructed need not be the same as any other color j.

3. Simulations

Figure 10:
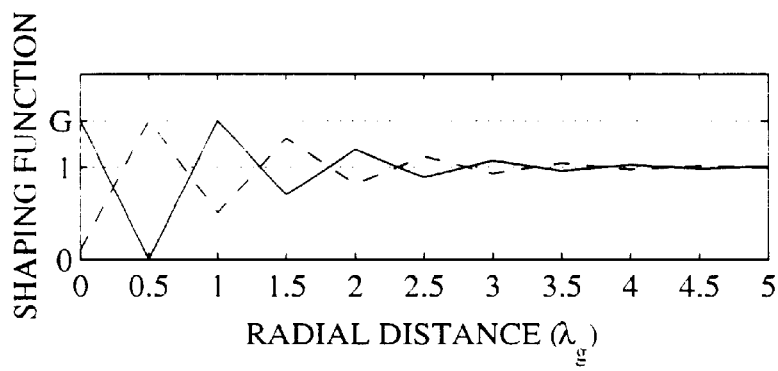
FIG. 10 is a graph showing a pair correlation shaping functions used to construct color green-noise with decreased overlap of minority pixels of different colors.

FIG. 10 shows a set of pair correlation shaping functions where the function $R_{i,i}(r)$ shapes the pair correlation between pixels of the same color and the function $R_{i,j}(r)$ shapes the pair correlation between pixels of different colors. This set of shaping functions is used to reduce the amount of overlap between pixels of different colors, as shown in FIG. 12(g). Using this same set of shaping functions but with $R_{i,j}(r)=1$ for all r, patterns with no correlation between channels (see FIG. 12(h)) can be constructed. To create a pattern where the overlapping of pixels of different colors is increased, the function $R_{i,j}(r)$ is set to have the same shape as $R_{i,i}(r)$ (see FIG. 12(i)).

Figure 11:
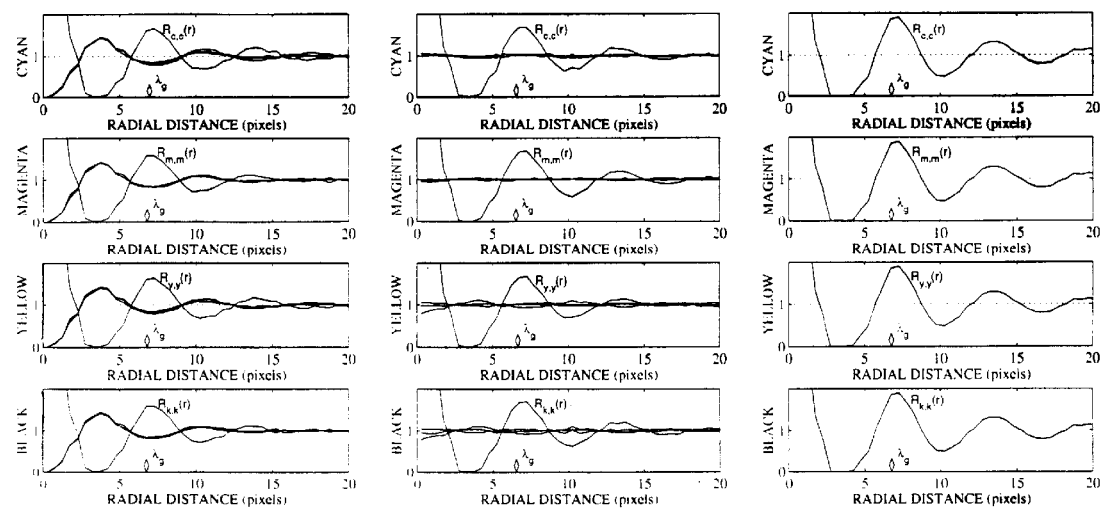
FIG. 11 are graphs showing CMYK dither patterns created using a VBIPPCCA algorithm with decreased overlapping (left), uncorrelated overlapping (center), and increased overlapping (right)

The BIPPCCA-generated patterns shown in FIGS. 12(g)–12(i), generated by BIPPCCA, were constructed to represent a 91×91 pixel input image of constant color $\bar{x}[n]=[\frac{1}{8}, \frac{1}{8}, \frac{1}{8}, \frac{1}{8}]^T$ with an average of 5 pixels per cluster ($\lambda_g=6.32$ pixels). The statistical measures of the spatial relationships between pixels for these three patterns are shown in FIG. 11. The results demonstrate BIPPCCA's ability to capture the same spatial relationships between pixels as those created in FIGS. 12(a)–12(c), via generalized error diffusion. The key is in the shaping functions, and since them the same relationships between minority pixels can be encouraged in the design of green-noise masks.

Figure 13:
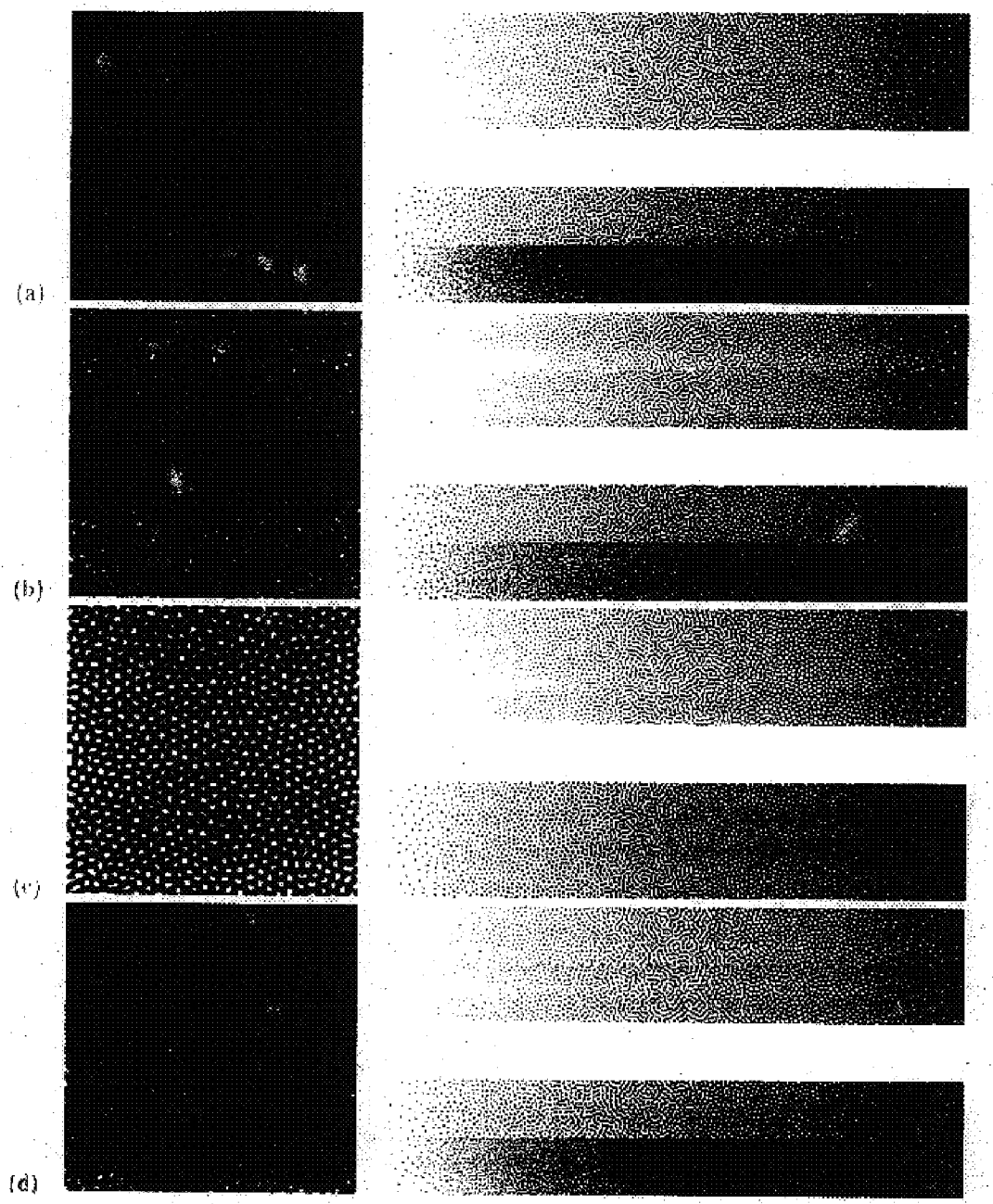
FIG. 13 shows CMYK green-noise masks constructed from VBIPPCCA that minimizes dot overlap (a), has uncorrelated overlap (b), maximizes overlap (c), and maximizes overlap for colors cyan and yellow (d)

Mask design can be seen in FIG. 13 (left) where the three design criteria: (1) decreased, (2) uncorrelated, and (3) increased pixel overlap are employed in masks (a), (b) and (c), respectively. Mask (d) is a special mask designed to demonstrate the range of possibilities for dither array generation. In mask (d), the colors cyan and yellow are designed to overlap while not overlapping with black or magenta. These colors black and magenta are uncorrelated with respect to each other. The CMYK-color scales shown in FIG. 13 (right) are given to further illustrate the clustering behavior of each mask. By design, each mask has an average cluster size of 2 pixels at extreme gray levels (g=0, 1) and an average cluster size of 12 pixels at g=½.

The present invention offers two new techniques for superior color reproduction. One need only optimize the parameters of green-noise for specific output devices. The advantage to using green-noise is that it is tunable, allowing for various cluster sizes for various dot-gain characteristics. Previous techniques such as error diffusion with output-dependent feedback and the green-noise mask could only be optimized or tuned within a given channel/color. Now both can consider the interactions of the component colors.

Figure 14:
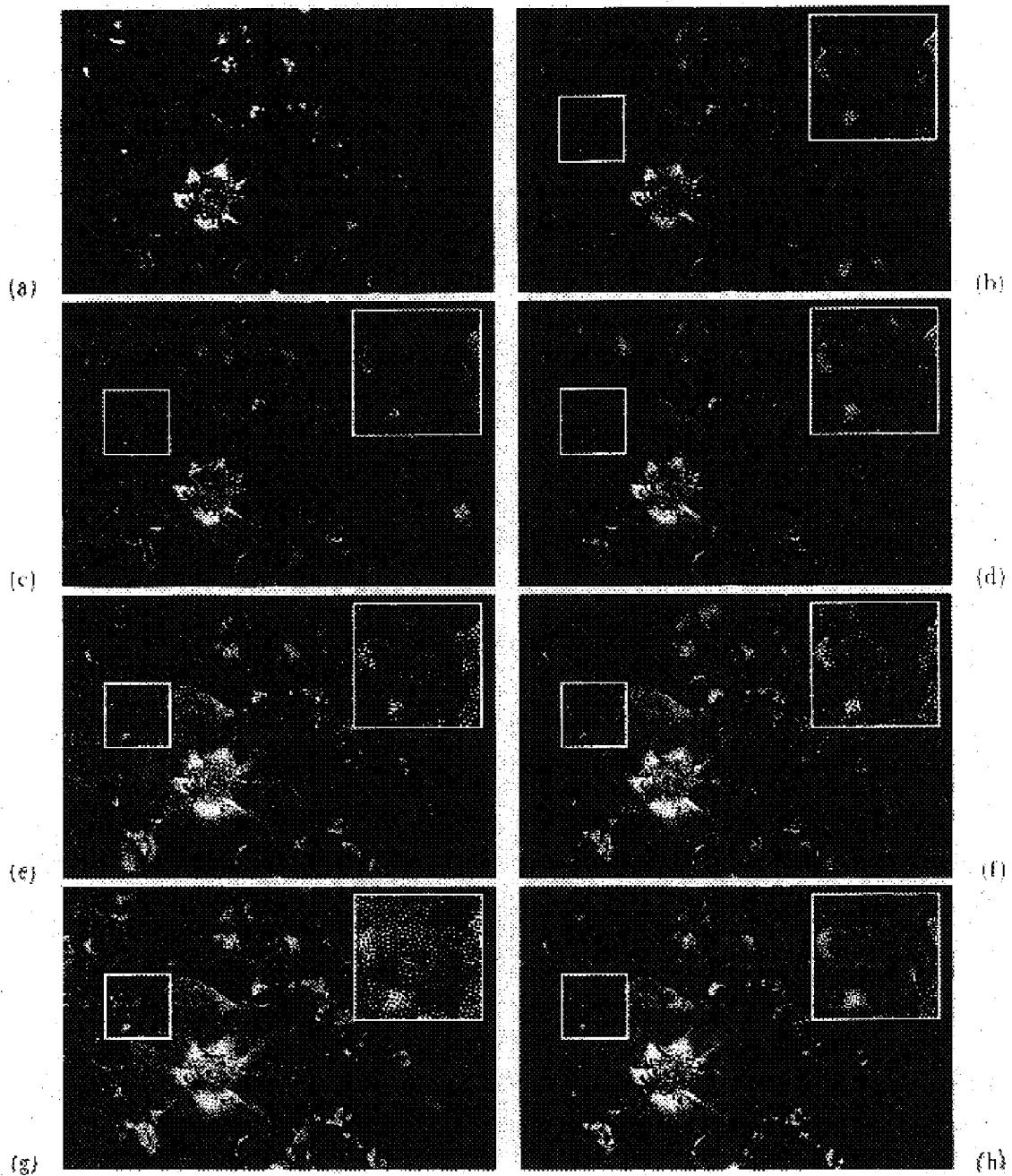
FIG. 14 shows CMYK halftoned images of an original color photograph (shown at (a)) using generalized error diffusion (b–d) and vector green-noise masks (e–h)

FIG. 14 shows a continuous tone CMYK image of flowers (FIG. 14(a)) with its corresponding halftone reproductions (FIGS. 14(b)–14(h)). The generalized error diffusions scheme give its best reproduction in FIG. 14(d), where the amount of overlap is increased, relative to the uncorrelated overlap of FIG. 14(c) and the decreased overlap of FIG. 14(b). In these three instances, the configurations of parameters (A, B, H and S) are exactly the same as those of Section C.3 and FIG. 7.

In FIGS. 14(e)–14(g), the same comparison of overlap is made using the vector green-noise masks of FIGS. 13(a)–13(c), respectively, where increased overlap gives the best color reproduction. Although these patterns appear "grainy" relative to their error-diffused counterparts, this shortcoming is not a function of masks in general, but rather of the design criteria used in the construction of these specific masks. That is, these masks are composed of clusters which are too large for the quality of printer being used (Tektronix Phaser 440 dye-sublimation), resulting in halftone patterns with visually disturbing artifacts such as the annoying cyan clusters in the predominantly magenta flower pedals.

A mask such as that used in FIG. 14(h) is much better suited to this printer as the spatial relationship between minority pixels is closer to blue-noise. Furthermore, this mask also takes into account the improved color reproduction achieved by increasing the overlap of minority pixels of different colors. As this mask makes good use of the printers ability to print individual pixels, it is a clear example of the tunability of green-noise for color halftoning.

Figure 16:
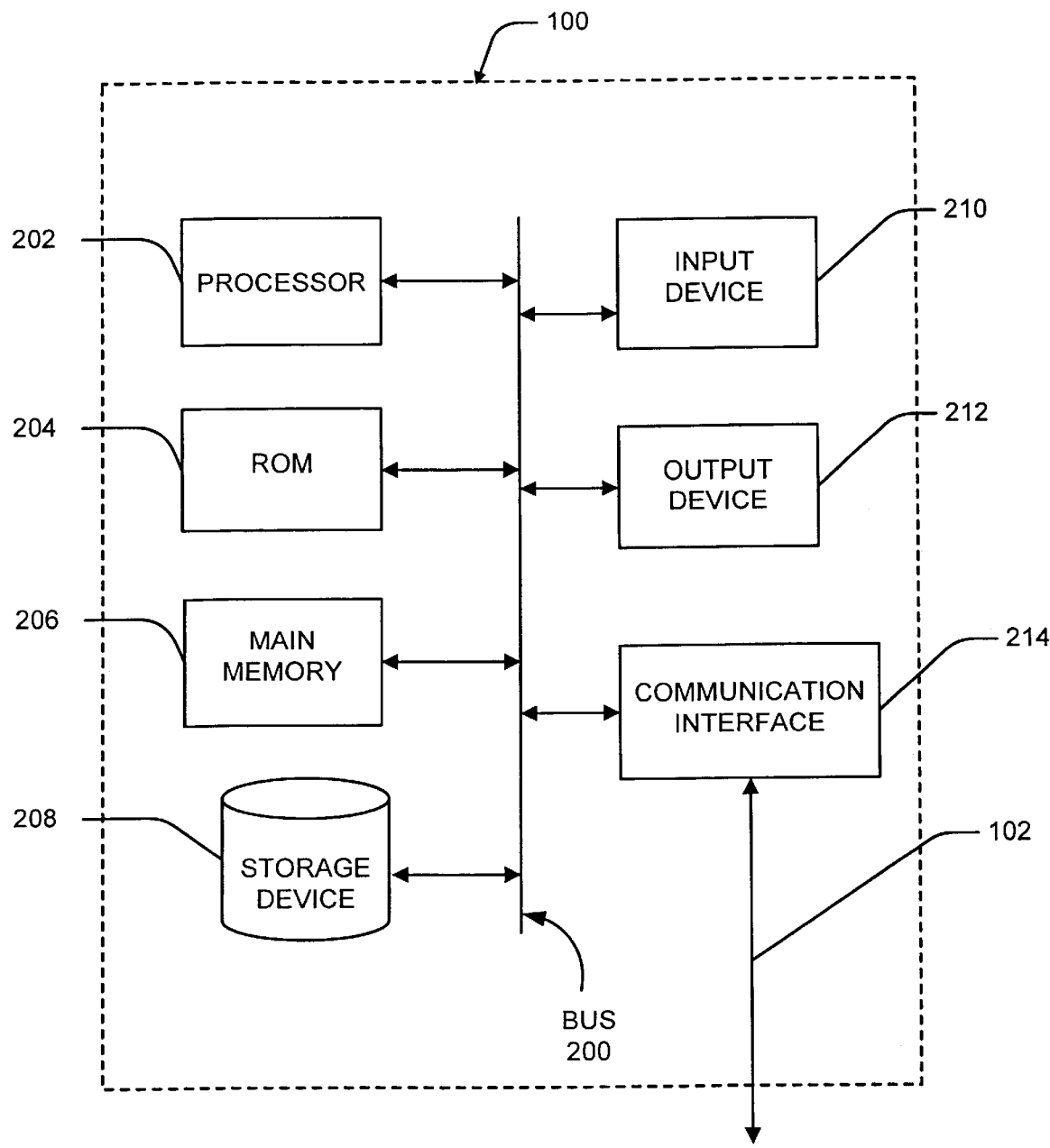
FIG. 16 is a schematic diagram showing a computing device capable of use with the methods and processes of the present invention.

A computing device may be used to perform any of the processes or methods of the present invention previously described. Such a computing device is shown generally as reference numeral 100 in FIG. 16.

Computing device 100 includes a bus 200 interconnecting a processor 202, a read-only memory (ROM) 204, a main memory 206, a storage device 208, an input device 210, an output device 212, and a communication interface 214. Bus 200 is a network topology or circuit arrangement in which all devices are attached to a line directly and all signals pass through each of the devices. Each device has a unique identity and can recognize those signals intended for it. Processor 202 includes the logic circuitry that responds to and processes the basic instructions that drive computing device 100. ROM 204 includes a static memory that stores instructions and date used by processor 202.

Computer storage is the holding of data in an electromagnetic form for access by a computer processor. Main memory 206, which may be a RAM or another type of dynamic memory, makes up the primary storage of computing device 100. Secondary storage of computing device 100 may comprise storage device 208, such as hard disks, tapes, diskettes, Zip drives, RAID systems, holographic storage, optical storage, CD-ROMs, magnetic tapes, and other external devices and their corresponding drives.

Input device 210 may include a keyboard, mouse, pointing device, sound device (e.g. a microphone, etc.), biometric device, or any other device providing input to computing device 100. Output device 212 may comprise a display, a printer, a sound device (e.g. a speaker, etc.), or other device providing output to computing device 100. Communication interface 214 may include network connections, modems, or other devices used for communications with other computer systems or devices, as shown by reference numeral 102.

As described above, a computing device 100 consistent with the present invention may perform any of the methods or processes of the present invention. Computing device 100 performs these tasks in response to processor 202 executing sequences of instructions contained in a computer-readable medium, such as main memory 206. A computer-readable medium may include one or more memory devices and/or carrier waves.

Execution of the sequences of instructions contained in main memory 206 causes processor 202 to perform processes that will be described later. Alternatively, hardwired circuitry may be used in place of or in combination with software instructions to implement processes consistent with the present invention. Thus, the present invention is not limited to any specific combination of hardware circuitry and software.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of color printing using green-noise halftoning, the method comprising the step of:

extending error diffusion with output-dependent feedback to cluster pixels of like color and to regulate the clustering of pixels of different colors, wherein the halftoning of different colors is correlated such that the superimposing of different inks is increased or decreased, offering greater control of resulting halftone patterns.

2. A method of color printing using green-noise halftoning, the method comprising the step of:

incorporating a desired correlation between colors to construct a vector green-noise mask, wherein the mask maintains all the desirable attributes of a monochrome mask, including isotropic and tunable coarseness, while regulating the overlapping of pixels of different colors.

3. A method of color printing, using green-noise halftoning, comprising the step of:

extending error diffusion to regulate the overlapping of different colored pixels, wherein the halftoning of different colors is correlated such that the superimposing of different inks is increased or decreased, offering greater control of the resulting halftone pattern.

4. A method of color printing, where $\{\phi_{i,gi}: i=1, 2, \ldots, C\}$ is an initial set of empty M×N arrays, and C, M and N are integers, the method comprising the steps of:

creating a set of M×N arrays, $\{U_1, U_2, \ldots, U_C\}$, of uniformly distributed random numbers such that $U_i[m, n] \in (0, 1)$ is the probability that $\phi_{i,gi}$ will become a minority pixel;

for each pattern $\phi_{i,gi}$, where the ratio of the total number of minority pixels to the total number of pixels is less than a gray level $g_i$, performing the following substeps:

constructing a concentration matrix $CM_i$ using a user-defined mapping of, $\{H_{LP}(x) \phi_{i,gi}\}$, the output after filtering $\phi_{i,gi}$ with the low-pass filter $H_{LP}$ using circular convolution, locating a majority pixel in $\phi_{i,gi}$ with a highest modified probability, and replacing that pixel, $\phi_{i,gi}[m, n]$, with a minority pixel, wherein the majority pixel with the highest modified probability is a majority pixel $\phi_g[m, n]$ such that $U[m, n] \times CM[m, n] > U[o, p] \times CM[o, p]$ for all $1 \leq o \leq M$ and $1 \leq p \leq N$ where $\phi_g[o, p]$ is also a majority pixel, and given the new minority pixel, $\phi_{i,gi}[m, n]$, adjusting the probability of each and every majority pixel, $\phi_{l,gl}[o, p]$ for $l=1, 2, \ldots, C$, such that:

$$(U_l[o, p])_{new} = (U_l[o, p])_{old} \times R_{l, i}(r)$$

where r is the minimum wrap-around distance from the majority pixel $\phi_{l,gl}[o, p]$ to the new minority pixel $\phi_{i,gi}[m, n]$; and obtaining the desired color dither pattern given by the set $\{\phi_{i,gi}: i=1, 2, \ldots, C\}$ if for all colors i, the ratio of the total number of minority pixels to the total number of pixels in $\phi_{i,gi}$ is equal to $g_i$, otherwise, returning to the locating substep.

5. An apparatus for color printing using green-noise halftoning, comprising:

storage means for storing data on a storage medium; and a computer processor means for processing data from the storage means, and for extending error diffusion with output-dependent feedback to cluster pixels of like color and to regulate the clustering of pixels of different colors, wherein the halftoning of different colors is correlated such that the superimposing of different inks is increased or decreased, offering greater control of resulting halftone patterns.

6. An apparatus for color printing using green-noise halftoning, comprising:

storage means for storing data on a storage medium; and a computer processor means for processing data from the storage means, and for incorporating a desired correlation between colors to construct a vector green-noise mask, wherein the mask maintains all the desirable attributes of a monochrome mask, including isotropic and tunable coarseness, while regulating the overlapping of pixels of different colors.

7. An apparatus for color printing using green-noise halftoning, comprising:

storage means for storing data on a storage medium; and a computer processor means for processing data from the storage means, and for extending error diffusion to regulate the overlapping of different colored pixels, wherein the halftoning of different colors is correlated such that the superimposing of different inks is increased or decreased, offering greater control of the resulting halftone pattern.

8. An apparatus for color printing, where $\{\phi_{i,gi}: i=1, 2, \ldots, C\}$ is an initial set of empty M×N arrays, and C, M and N are integers, comprising:

storage means for storing data on a storage medium; and a computer processor means for processing data from the storage means, the processor means performing the following the steps:

creating a set of M×N arrays, $\{U_1, U_2, \ldots, U_C\}$, of uniformly distributed random numbers such that $U_i[m, n] \in (0, 1)$ is the probability that $\phi_{i,gi}$ will become a minority pixel;

for each pattern $\phi_{i,gi}$, where the ratio of the total number of minority pixels to the total number of pixels is less than a gray level $g_i$, performing the following substeps:

constructing a concentration matrix $CM_i$ using a user-defined mapping of, $\{H_{LP} \otimes \phi_{i,gi}\}$, the output after filtering $\phi_{i,gi}$ with the low-pass filter $H_{LP}$ using circular convolution, locating a majority pixel in $\phi_{i,gi}$ with a highest modified probability, and replacing that pixel, $\phi_{i,gi}[m, n]$, with a minority pixel, wherein the majority pixel with the highest modified probability is a majority pixel $\phi_g[m, n]$ such that $U[m, n] \times CM[m, n] > U[o, p] \times CM[o, p]$ for all $1 \leq o \leq M$ and $1 \leq p \leq N$ where $\phi_g[o, p]$ is also a majority pixel, and given the new minority pixel, $\phi_{i,gi}[m, n]$, adjusting the probability of each and every majority pixel, $\phi_{l,gl}[o, p]$ for l=1, 2, . . . , C, such that:

$(U_l[o, p])_{new} = (U_l[o, p])_{old} \times R_{l,i}(r)$ where r is the minimum wrap-around distance from the majority pixel $\phi_{l,gl}[o, p]$ to the new minority pixel $\phi_{i,gi}[m, n]$; and obtaining the desired color dither pattern given by the set $\{\phi_{i,gi}: i=1, 2, \ldots, C\}$ if for all colors i, the ratio of the total number of minority pixels to the total number of pixels in $\phi_{i,gi}$ is equal to $g_i$, otherwise, returning to the locating substep.

* * * * *

UNITED STATES PATENT AND TRADEMARK OFFICE
CERTIFICATE OF CORRECTION

PATENT NO.    : 6,798,537 B1  Page 1 of 1
DATED         : September 28, 2004
INVENTOR(S)   : Daniel L. Lau et al.

It is certified that error appears in the above-identified patent and that said Letters Patent is hereby corrected as shown below:

<u>Title page,</u>
Item [75], Inventors, "Arec" should be replaced with -- Arce --.

Signed and Sealed this

Fourth Day of January, 2005

JON W. DUDAS
*Director of the United States Patent and Trademark Office*